United States Patent [19]

Williams

[11] 4,456,401
[45] Jun. 26, 1984

[54] METHOD AND APPARATUS FOR RELINING UNDERGROUND PASSAGEWAY

[75] Inventor: Augustus Williams, Clifton Park, N.Y.

[73] Assignee: Finic, B.V., Rotterdam, Netherlands

[21] Appl. No.: 319,557

[22] Filed: Nov. 9, 1981

[51] Int. Cl.³ .................. E21D 11/00; B29C 27/16; B32B 31/20
[52] U.S. Cl. ........................... 405/150; 156/294; 138/97; 264/516; 264/36; 405/146
[58] Field of Search .............. 405/146, 150, 184; 264/36, 269, 516, 35, 32; 138/97, 98; 427/230, 231; 118/408; 156/294

[56] References Cited

U.S. PATENT DOCUMENTS

| | | | |
|---|---|---|---|
| 3,394,025 | 7/1968 | McCune | 138/97 |
| 4,032,677 | 6/1977 | Ichioka et al. | 118/419 |
| 4,064,211 | 12/1977 | Wood | 405/150 |
| 4,325,772 | 4/1982 | Suetoshi et al. | 156/294 |
| 4,350,548 | 9/1982 | Zenbayashi et al. | 405/150 |

*Primary Examiner*—Dennis L. Taylor
*Attorney, Agent, or Firm*—Jim Zegeer

[57] ABSTRACT

There is disclosed a method, apparatus and system for in situ relining underground pipes, lines and passageways particularly sewer lines. A sewer line which has deteriorated and/or otherwise requires repair is cleaned in a conventional manner by use of high pressure water jets to dislodge debris and clean the line, a T.V. inspection of the line is made to determine where the defects are located and to make a log of all ties and intersects. A moisture barrier, such as a thin polyethylene film, is installed along with a resin impregnable felt liner, the polyethylene film serving to prevent absorption of water or other moisture or contaminant by the felt liner and permitting thereby full absorption of resin by the liner. With the upstream end of the felt tube molded or otherwise sealed to the existing end of the sewer line a steel rod is then passed through the inside of the felt liner between the two points between which the repair is being made. The felt liner or mat is then squeegeed smooth and impregnated with a liquid resin material, again squeegeed smooth and immediately, curing of the resin is initiated applying hydraulic pressure and heat to the internal surfaces of the resin absorbing material. The felt liner is impregnated with the resin under pressure between the spaced pair of spaced squeegees, the first squeegee in the direction of travel serving to iron or otherwise smooth the internal surfaces of the felt liner and form the upstream end of a traveling resin impregnating chamber. A trailing squeegee(s) form the downstream end of the traveling resin depositing chamber apparatus and also serves to further assure smoothness of the internal surfaces of the felt liner which has just been impregnated with the resin. In addition to assuring uniformity and smoothness of the internal surfaces, the trailing squeegee has a trailing section which receives the everting end of a resin curing polyethylene tube which is maintained full of heated water under pressure thereby applying a uniform heat and pressure to the resin impregnated felt tube to immediately initiate curing of same. There is therefore a positive force acting via the squeegees to initially smooth and eliminate wrinkles and bubbles and other surface defects and then heat and a fluid hydraulic pressure is utilized to cure the resin and maintain the sidewalls in the ironed or smoothed condition.

12 Claims, 5 Drawing Figures

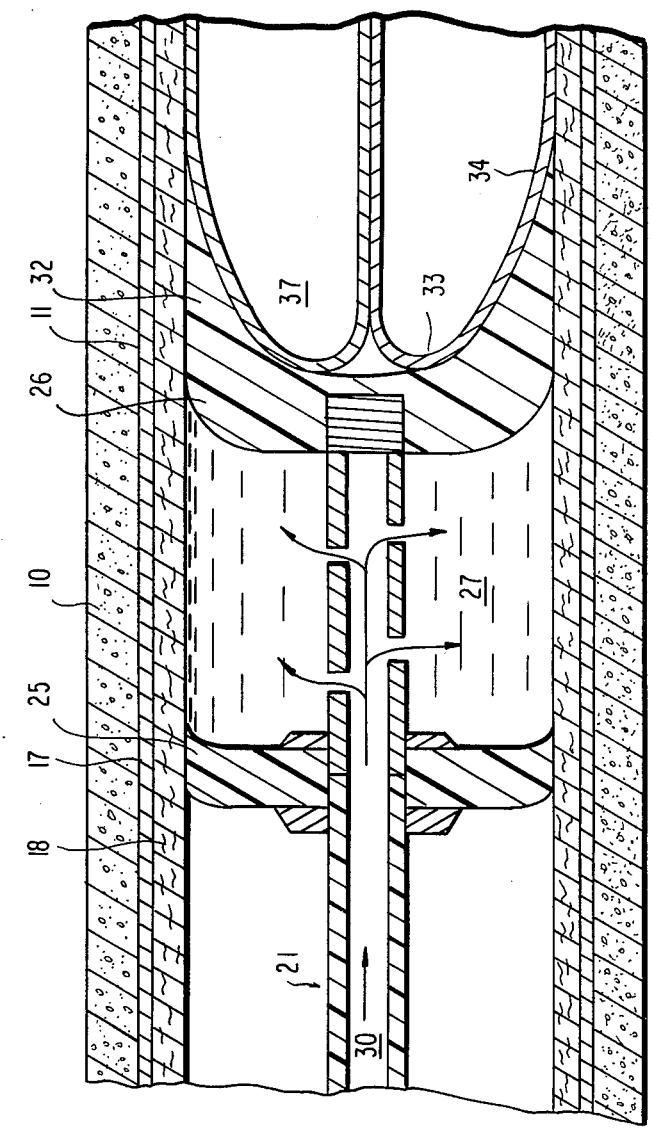

METHOD AND APPARATUS FOR RELINING UNDERGROUND PASSAGEWAY

PRIOR ART STATEMENT AND BACKGROUND OF THE INVENTION

The use of plastic materials for the in situ relining of underground pipelines such as sewer and gas lines and water mains is well known in the art. In Vandingberg U.S. Pat. No. 1,736,293, leaky conduits are repaired by introducing a fluid sealing material into the interior of the pipe and then forcing of the material through the leaking apertures and/or joints under a head of pressure until the material filling the apertures and/or leaks has solidified and then removing the excess material. In Perkins U.S. Pat. No. 1,988,329, a pipe is lined using a spray apparatus and then a kind of troweling operation is utilized to smooth the coated interior of the pipe. In this prior art example, the protective coating is a "plastic like material as concrete". In Witska U.S. Pat. No. 3,144,880, sewer pipelines are repaired by dispensing a fluent sealing material into the pipe. Hight et al U.S. Pat No. 3,2211,573 discloses a system for repairing pipes by applying a plastic lining via an applicator which is inserted through an exposed end of the pipe. In Huisman U.S. Pat. No. 3,122,786, the pipe is internally lined by extruding the liner in place of the pipe. This system is used only above ground but has been utilized in other patent disclosures for pipe repair. Blount et al U.S. Pat. No. 3,123,101 discloses a system for repairing pipe lines in which an inflatable liner is used to form an annular space into which a mixture of bentonite and mud is injected. The inflatable casing can be left in the pipe as an additional liner. In Van Arp U.S. Pat. No. 3,885,521 an apparatus for coating the inner wall of a duct is disclosed in which forward and rearward axially displaceable pistons have a coating mass therebetween which is distributed on the interior duct surfaces and trailing polishing bristles are used to position the applied coating.

In Harper et al U.S. Pat. No. 2,794,758, a flexible tubular plastic liner is inserted either by reversing or everting the liner upon itself or by drawing it through a pipeline and using fluid pressure to cause it to engage and conform to the internal wall of the pipeline. The plastic liner may be caused to adhere to the internal wall surface by an adhesive on the external surfaces of the liner which would be the internal surfaces prior to everting. In Lang et al U.S. Pat. No. 3,132,062, a rigid liner is formed in situ by use of multiple lamina with a polymerizable compound or a thermosetting resin. In such system, pressure is maintained until the polymerizable compound is polymerized and/or the thermosetting resin has set and/or been cured, to provide a rigid liner inside the pipeline, collapse of the liner being prevented by the rigidity which the resin bond imparts to the laminated liner. In Rubenstein U.S. Pat. Nos. 3,532,132, 3,340,115, and 3,424,203, in place relining and repair of pipelines is disclosed using layers of resin absorbent fibrous reinforcing material impregnated with polymerizable polymeric resin composition which is cured in place. In Wood U.S. Pat. No. 4,009,063, a laminar structure is formed in situ using a tubular fibrous felt liner immersed in a resin, in which the felt is immersed in the resin just prior to installation. The resin is cured to form a hard rigid lining with felt imbedded therein, there being an outer plastic film which contacts the internal wall of the passage being relined and an inner plastic liner to form a liner composed of a laminate of non-woven felt sandwiched between an outer membrane and an inner membrane both which membranes are plastic sheets. In Wood U.S. Pat. No. 4,064,211, the liner is in the form of a flattened tube of felt which has been impregnated with a synthetic resin. In order to eliminate friction, the liner is supported buoyantly by a liquid which serves to carry the same. In Wood U.S. Pat. No. 4,135,958, instead of pre-impregnating the liner, a pool or quantity of resin is formed between the liner just before it everts to thereby avoid the weight of the resin creating riction as it is drawn on the inside of the previously applied liner. In the foregoing processes, there is no positive force applied to assure uniformly smooth walls with no wrinkles in the plastic liner and that the resin is uniformly distributed where desired in the resin absorbent material.

In accordance with the present invention, the walls of the underground pipeline are thoroughly cleaned, which in the case of a sewer system, is done by the use of angulated water jets at high pressure used to dislodge and clean the line. A television camera is used to perform an inspection of the line to determine what the defects are and to make a log of all ties and intersects. Thereupon, a felt liner, coated on the outside (the side nearest the sewer walls) with a fluid impermeable plastic film, such as polyethylene film, is installed. The polyethylene film can be installed prior to installation of the felt liner and can be installed simply by everting a polyethylene film tube using air pressure or the like or the polyethylene film as a tube can be telescoped over the felt liner or it can be formed by welding a seam along the longitudinal sides of the film directly over the felt liner. At any rate, the polyethylene film prevents absorption of water or other contaminating fluids by the felt liner so as to permit full absorption of the desired resin. A steel cable or rod is then passed from between the two ends of the liner being installed e.g. from one man hole to another. The upstream end of the felt tube is molded or otherwise sealed to the end of the end of the existing underground passageway. The still dry felt tube, mat or "bag" is then squeegeed, impregnated with a liquid resin material in an amount determined by the record of condition of the walls established by the T.V. scan squeegeed again and then the resin is immediately cured by applying hydraulic pressure and heat to the internal surfaces of the resin material which has been absorbed by the felt liner.

The process of impregnating the felt with the resin and at the same time assuring that all wrinkles, bubbles etc. are eliminated is performed by coupling at least a pair of squeegees to the steel cable and a chemical resin feed line to the chamber(s) formed between the two squeegees. Thus, the space between a leading squeegee and the trailing squeegee forms a travelling or moveable resin depositing chamber or appartus, the resin being sprayed upon the felt or a full chamber resin is provided and maintained under pressure by the feed line. At the same time, the rate of movement of the moveable resin chamber and/or the pressure on the liquid resin can be controlled so as to control the degree of resin impregnation. Moreover, the resin composition can be changed to control the type, quality and curing speed of the resin at any point in the underground passageway being relined, more resin being applied at certain points if desired or a different resin having different characteristics can be applied at different points in the line being relined. As noted above, the lead squeegee irons or smooths the internal surfaces of the felt and, in combination with the trailing squeegee, maintains a certain degree of tension on the felt without tearing the same. The trailing squeegee in addition to assuring uniformity and smoothness of the now resin impregnated felt, also has a trailing section which receives the everting end of a resin curing tube which specifically is made of polyethylene and is adhered in place upon curing of the resin.

When the depositing apparatus is placed inside the felt, a stand pipe is set against the pipe at the manhole wall. This stand pipe shall reach above the manhole ring and frame, the polyethylene bag having the same size as the fibrous or felt tube installed will be passed through the stand pipe folded over the outside bottom end of the stand pipe and clamped tightly in place. Water will then be introduced into the stand pipe forcing the polyethylene bag inside the line and against the upstream or trailing squeegee. As the apparatus is moved, this polyethylene bag will evert and immediately cover and apply pressure to the resin impregnated felt tube. The resin curing polyethylene tube is maintained full of heated water or steam under pressure so as to apply a uniform pressure to the resin impregnated felt tube immediately after the impregnation thereof so as to initiate the curing of the resin. In the preferred embodiment, the everting end of the polyethylene tube is inside the squeegee trailing section and applies pressure against the upstream or trailing squeegee so that immediately as the trailing squeegee passes by, pressure is exerted on the felt and, at the same time, the curing of the resin begins by virtue of the heated water or fluid inside the polyethylene tube. With the steel rod or cable being pulled at a set rate, the amount of resin being cured via a pump and mixing vehicle above ground is initiated to begin impregnating the resinous material into the felt immediately as the first squeegee smooths and irons the unimpregnated felt. The trailing squeegee, having the trailing rubber sleeve, in which is nested the everting end of the polyethylene tube, smooths the new resin impregnated felt so that, as it passes the resin impregnated felt, pressure is always applied to the resin impregnated felt, first in the resin impregnating chamber, second by the trailing squeegee and its trailing rubber sleeve, and then by the everting polyethylene tube with the heated fluid therein. When the depositing apparatus is moved, the everted polyethylene bag will immediately move due to the hydrostatic head. As the rubber squeegees or discs are moved down the pipe, the resin would immediately be covered by the everting polyethylene bag. The water inside of the everting polyethylene can be heated at the start of the process thereby cutting down on final cure time. Thus, there are positive forces acting via the squeegees to initially smooth and eliminate wrinkles and bubbles and other surface defects and then a fluid hydraulic pressure is utilized to maintain the side walls in the ironed condition until the resin is cured. Thus, besides the reduction in the time involved, the squeegeeing operation and the immediate application of hydraulic pressure via the everting tube and the immediate application of a curing temperature to the resin provides a smoother surface and faster installation time. Thus, as compared to the prior art, the finished relined wall has an improved quality in that the quality can be controlled and the time of installation is reduced.

BRIEF DESCRIPTION OF THE DRAWINGS

The bove and other objects, advantages and features of the invention will become more apparent when considered with the accompanying specification and drawing wherein:

FIG. 5 is an enlarged sectional view of the resin impregnating apparatus and process illustrated in FIG. 3.

Referring to FIG. 1, the invention will be described in connection with the relining of an underground sewer line 10 in which the existing sewer line 10, which may be brick, tile, concrete pipe and the like, has an existing sewer wall surface 11, which is in need of repair, and which is thoroughly cleaned in a conventional manner by the use of water jets. As illustrated in FIG. 1, water, preferably at very high pressure (1400 pounds per square inch) is delivered through a flexible pipe or hose 13 to a water jet nozzle 14 which has the nozzles thereof 15 directed at an angle to the wall surface 11, the water jets 16 issuing from nozzles 14 being used to dislodge and clean the surfaces 11 of the sewer line. Other cleaning techniques may be used to clean surface 11, but in the preferred embodiment, the high pressure water jet is utilized. The high pressure jets 16 are directed at an angle to the wall surfaces 11 to thoroughly scour and clean the walls, the water jet cleaning operation taking several passes through the sewer line, so that in a first pass, the jets being rearwardly directed pull the jet head 14 through the sewer line (by jet reaction forces) and then the cable and flexible hoses 13 being used to withdraw the jet head 14 in a direction opposite the direction angling of the jets 15. This results in a thorough cleaning of the walls as described above. After the walls have been thoroughly cleaned, a television camera is passed through the line to make a T.V. inspection or scan thereof and determine the nature and location of surface defects and make a log of all ties and intersects, this cleaning and television inspection of the line as well as the making of the log is a common procedure well known in the art.

Referring now to FIG. 2, a thin fluid impermeable film 17, preferably polyethylene, in tube form is inserted against the wall surfaces 11 of sewer pipe 10 to provide a dry internal working space. Plastic liner 17 may be installed in the manners disclosed in Harper et al U.S. Pat. No. 2,794,758 and Lang et al U.S. Pat. No. 3,132,062. At the same time as liner 17 is being installed, it may also carry with it a resin impregnable fibrous tube 18, which in the preferred embodiment can be felt, fiberglass, woven or non-woven. Steel fiber can be used to meet specific structural needs. The felt tube 18 is installed dry and within the dry working space provided by external line 17. It will be appreciated that the felt tube 18 can be installed as liner 17 is being everted and/or otherwise being installed in sewer line 10 or, may be installed separately by passing a cable through the liner 17 and drawing same therethrough while the liner 17 is maintained against the wall surface 11 under air pressure.

Figure 1:
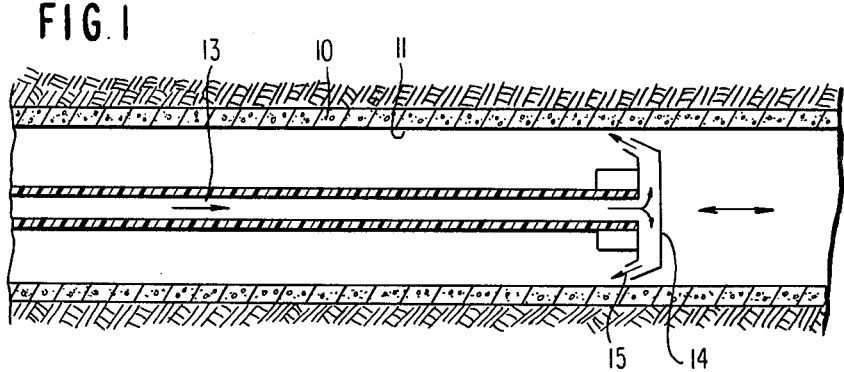
FIG. 1 is a cross sectional view of an existing sewer wall surface showing the cleaning thereof by use of a high pressure water jet.
Figure 2:
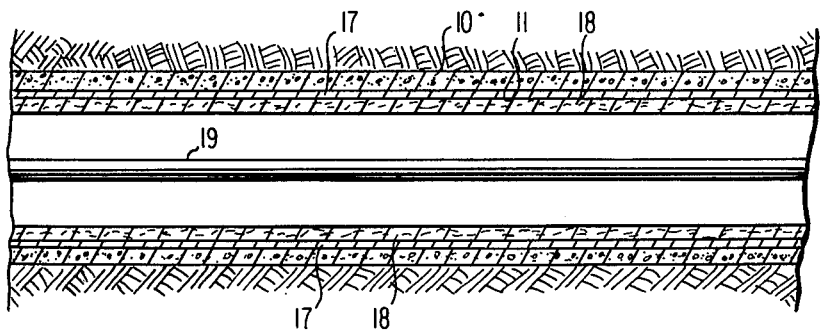
FIG. 2 is a cross sectional view of the sewer line of FIG. 1 in which has been installed a plastic liner and a resin impregnatable felt tube and a steel pull rod or cable and accompanying resin feed line.
Figure 3:
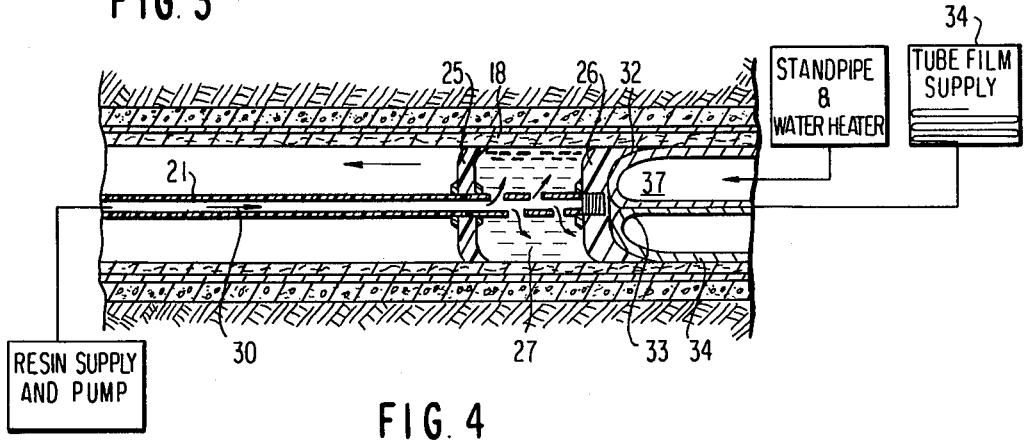
FIG. 3 illustrates the cross sectional view of the resin impregnation and curing of the felt tube according to the invention.
Figure 4:
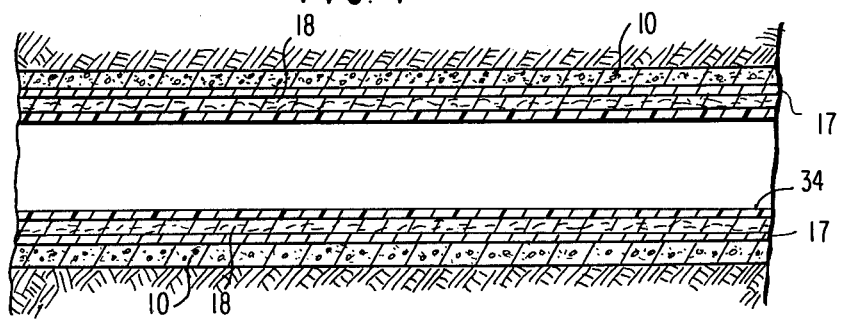
FIG. 4 is a cross sectional view of a relined underground passageway incorporating the invention.

After installation of the felt tube 18, a steel rod or cable 19 is passed from one main hole to another and within the felt tube 18 steel rod or cable 19 may include or have attached thereto a flexible hose 21 (shown in FIG. 3).

With reference now to FIG. 3 and FIG. 5, the resin impregnating and curing apparatus is shown as incorporating an upstream squeegee 25, a downstream squeegee 26 both secured to the cable 19 and spaced apart a short distance to form a resin impregnating chamber 27. It is obvious that there may be several squeegees forming plural chambers and a separate resin feed line to each of the chambers to vary the resin and specification of the liner being formed. Resin feed line 21 supplies resin 30 to the chamber 27. The resin, which may be an epoxy, vinylester or similar durable liquid, can fill the chamber or can simply be dispensed from spray nozzle (not shown) to impregnate the felt tube 18. However, prior to being impregnated with the resin 30, upstream squeegee 25 smooths, irons and draws slightly taut the felt tube 18 so as to prepare the tube 18 for better impregnation of resin 30 therein. All wrinkles and bubbles and any other contaminants of fluids between the external surface of plastic tube 17 is forced out by the squeegee since this pressure is applied through the felt 18 to the plastic liner tube 17. Moreover, the short spacing between the upstream squeegee 25 and downstream aqueegee 26 assures the uniformity of the application and impregnation of felt tube 18 with the resin 30. Moreover, since the felt tube 18 had just been ironed by upstream squeegee 25, there is less tendency for the formation of wrinkles and/or bubbles since as the mechanical pressure exerted by the upstream squeegee 25 is removed, and there is a slight uncompressing of the felt liner 18, it absorbs or draws in a more uniform quantity of resin. Moreover, the rate of movement of the moveable resin chamber and/or the pressure of the liquid resin 30 can be closely controlled so as to control and assure proper impregnation.

The trailing squeegee 26, in addition to assuring uniformity and smoothness of the internal surfaces of the now resin impregnated felt reinforcement tube 18, also has a trailing section 32 which receives the everting end 33 of a resin carrying polyethylene tube or inner liner 34. Resin carrying polyethylene tube 34 is maintained full of heated water or steam under pressure so as to apply a uniformed pressure to the resin impregnated felt tube immediately after the impregnation of same to initiate the curing period. This is in direct contrast to all prior art techniques where the curing was required to take place at some later time and the resin impregnated felt tubes had to be transported to a site under refrigeration conditions. As illustrated in FIG. 3 and FIG. 5, the everting end 33 is inside the trailing annular chamber 37 formed by the trailing section 32 of squeegee 26. Since the everting 33 of polyethylene 34 is within the trailing section 32, hydraulic pressure is applied through trailing section 32 which is flexible and forms the annular chamber 37. Thus, a pressure is applied against the trailing squeegee so that immediately as the squeegee passes by, pressure is exerted on the felt and at the same time curing of the resin begins by virtue of the heated water or fluid inside of the everted polyethylene tube 34. With the steel rod or cable 19 being pulled at a predetermined rate, the amount of resin fed via a pump or mixing vehicle above ground (not shown) is initiated to begin the impregnating of the resinous material into the felt immediately as the first squeegee smooths down and passes down the internal surfaces of the felt tube 18. The second squeegee 26, having the trailing rubber sleeve 32, smooths the now resin impregnated felt 18 so that as it now passes the resin impregnated felt it always has the pressure exerted thereon, first by the squeegee in the resin impregnating chamber, second by the trailing squeegee 26 and its trailing rubber sleeve 32 (the resin serving to lubricate, somewhat, the external surface of trailing sleeve 32) and by the everting polyethylene tube 34 with the heated fluid herein. Thus, there is a positive force acting via the squeegees to initially smooth and eliminate wrinkles bubbles and other surface defects (as well as removing any fluent materials from between the external surfaces of plastic liner 17 and the internal wall surfaces 11 of sewer pipe 10, and other surface defects and then a fluid hydraulic pressure is utilized to maintain the side walls in the ironed condition. Besides the reduction of time involved, the squeegeeing operation and the immediate application of hydraulic pressure via the everting tube 34 and the immediate application of a carrying temperature to the resin provides a smoother surface and faster installation time.

After the setting or curing of the resin, the T.V. log or scan is used to locate the ties or intersects and a conventional boring or cutting tool is used to reopen the intersection or tie. It will be appreciated that as in the normal underground pipe relining art, the use of the ties or intersects is suspended during the relining process discribed above.

The invention is susceptable to a wide variety of embodiments readily obvious to those skilled in the art and is not to be construed to be limited to the apparatus and process described above in connection with preferred embodiment of the invention. Instead, the invention is to be construed and limited only by the spirit and scope of the claims appended hereto.

What is claimed is:

1. A method of forming a tubular fiber reinforced plastic tube in an underground flow passage comprising:
   (1) inserting a fluid impervious tubular lamina against the internal surfaces of said underground flow passage,
   (2) inserting a resin absorbent fiber reinforcing tubular lamina in said impervious tubular lamina,
   (3) mechanically smoothing the interior surfaces of said resin absorber fiber reinforcing tubular lamina,
   (4) impregnating the mechanically smoothed resin absorbent reinforcing tubular lamina with resin in a fluid state,
   (5) mechanically smoothing the resin impregnated portions of said fiber reinforcing tubular lamina,
   (6) applying fluid pressure via an impervious membrane immediately after step 5,
   (7) curing the resin and then
   (8) removing the fluid pressure.

2. The invention defined in claim 1 whereas there is transition between steps 5 and 6 wherein both mechanical smoothing and hydraulic pressure are commonly applied to the resin impregnated felt.

3. The invention defined in claim 1 wherein the step of curing said resin (step 7) includes the heating of the fluid used to apply fluid pressure (step 6).

4. A method of forming a rigid tubular element in underground sewer passageways, comprising;

(1) cleaning the exposed surfaces removing debris and solid matter from said underground sewer passageway, (2) inserting a flexible water proof tubular fluid impermeable plastic membrane in said sewer passageway and in contact with said walls, said plastic membrane including a tubular layer of resin absorbant material on the side thereof opposite the side in contact with said sewer passageway wall, (3) after insertion of said fluid impermeable membrane and resin absorbant layer in said sewer passageway, impregnating said resin absorbant material with a resin, (4) mechanically smoothing the resin impregnated absorbant material, (5) simultaneously as said mechanical smoothing is performed using hydraulic pressure to uniformly maintain said flexible water proof tubular layer in contact with the walls of said sewer passageway until said resin has been solidified to form said rigid tubular element.

5. The method defined in claim 4 scanning said underground sewer passageway from end to end and making a record of the condition of the walls after the cleaning thereof and removal of debris and solid matter and wherein said resin is applied in an amount determined by said record of the condition of the walls of said underground passage.

6. The invention defined in claim 4 wherein the step 4 of impregnating said resin absorbant material with a resin includes forming a moveable resin applying chamber and controlling the degree of resin impregnation by said resin absorbant material by controlling the rate of movement of said moveable resin applying chamber.

7. The invention defined in claim 6 wherein the control of the amount of resin impregnation is effected by controlling the speed of movement of said moveable resin applying chamber.

8. The invention defined in claim 6 wherein the control of the amount of the resin impregnation is effected by control of the pressure on said resin in said resin chamber.

9. The invention defined in claim 4 wherein said hydraulic pressure is applied by an impermeable plastic tube.

10. The invention defined in claim 9 wherein said impermeable plastic tube and is everted by the hydraulic pressure immediately following the mechanical smoothing specified in step 5.

11. Apparatus for impregnating a fiberous tube with an uncured liquid impregnant and curing the impregnant in an underground passageway, comprising, a first squeegee means for smoothing the internal surfaces of said fiberous tube, second squeegee means spacedly connected to said first squeegee means and forming one or more traveling impregnant chambers therebetween, said second squeegee means smoothing the internal surfaces of said fiberous tube after impregnation thereof, means for simultaneously moving said first squeegee and said second squeegee means on the interior of said fiberous tube, from one end toward the opposite end and supplying said one or more chambers with fluid impregnant, means for applying and maintaining fluid pressure on the impregnated fiberous tube until said impregnant has been cured and then removing the fluid pressure.

12. Apparatus as defined in claim 11 wherein said second squeegee means includes a flexible trailing sleeve forming an annulus, and said means for applying and maintaining fluid pressure on said impregnated fiberous tube is a flexible plastic tube having an everting end, said everting end being received and maintained in said annulus so as to apply said fluid pressure immediately following the passage of said second squeegee means through said fiberous tube.

* * * * *